(12) United States Patent
Yahil et al.

(10) Patent No.: US 6,993,204 B1
(45) Date of Patent: Jan. 31, 2006

(54) HIGH SPEED SIGNAL ENHANCEMENT USING PIXONS

(75) Inventors: Amos Yahil, Stony Brook, NY (US); Richard Puetter, San Diego, CA (US)

(73) Assignee: Pixon LLC, Stony Brook, NY (US)

( * ) Notice: Subject to any disclaimer, the term of this patent is extended or adjusted under 35 U.S.C. 154(b) by 676 days.

(21) Appl. No.: 10/041,253

(22) Filed: Jan. 4, 2002

(51) Int. Cl.
*G06K 9/40* (2006.01)
*G06K 9/56* (2006.01)

(52) U.S. Cl. .................. 382/265; 382/205; 382/275

(58) Field of Classification Search .............. 382/265, 382/275, 279, 205, 308, 190, 203, 209, 218, 382/278, 261, 254, 255; 358/447, 463; 378/4, 378/8; 348/606, 607, 389.1, 443, 641
See application file for complete search history.

(56) References Cited

U.S. PATENT DOCUMENTS

| | | | |
|---|---|---|---|
| 4,667,304 A | 5/1987 | Hier et al. | |
| 4,720,745 A | 1/1988 | DeForest et al. | |
| 4,908,876 A | 3/1990 | DeForest et al. | |
| 5,170,193 A | 12/1992 | McMillan et al. | |
| 5,440,647 A | 8/1995 | Floyd, Jr. et al. | |
| 5,444,819 A | 8/1995 | Negishi | |
| 5,467,404 A | 11/1995 | Vuylsteke et al. | |
| 5,500,685 A | 3/1996 | Kokaram | |
| 5,517,585 A | 5/1996 | Dowling | |
| 5,544,281 A | 8/1996 | Maruoka et al. | |
| 5,588,032 A | 12/1996 | Johnson et al. | |
| 5,758,031 A | 5/1998 | De Silva | |
| 5,761,442 A | 6/1998 | Barr et al. | |
| 5,802,218 A | 9/1998 | Brailean | |
| 5,842,199 A | 11/1998 | Miller et al. | |
| 5,912,993 A | 6/1999 | Puetter et al. | |
| 5,946,038 A | 8/1999 | Kalker | |
| 6,075,905 A * | 6/2000 | Herman et al. | ............. 382/284 |
| 6,166,384 A | 12/2000 | Dentinger et al. | |
| 6,233,364 B1 * | 5/2001 | Krainiouk et al. | .......... 382/275 |

(Continued)

FOREIGN PATENT DOCUMENTS

WO      WO 01/22276 A1     3/2001

OTHER PUBLICATIONS

Alexander, D. et al., "A Spectral Analysis of the Masuda Flare Using Yohkoh Hard X-Ray Telescope Pixon Reconstruction," *The Astrophysical Journal*, Nov. 1, 1997, pp. 442-445, vol. 489, The American Astronomical Society, U.S.A.

(Continued)

*Primary Examiner*—Samir Ahmed
(74) *Attorney, Agent, or Firm*—Eleanor M. Musick; Procopio Cory Hargreaves & Savitch LLP

(57) ABSTRACT

Input data comprising a video signal is processed using a combination of a known image processing method to deblur, or sharpen, the image and convolution with Pixon™ kernels for smoothing. The smoothing process utilizes a plurality of different size Pixon™ kernels which operate in parallel so that the input data are convolved with each different Pixon™ kernel simultaneously. The smoothed image is convolved with the point response function (PRF) to form data models that are compared against the input data, then the broadest Pixon™ kernel that fits the input data within a predetermined criterion are selected to form a Pixon™ map. The data are smoothed and assembled according to the Pixon™ map, then are deconvolved and output to a video display or other appropriate device, providing a clearer image with less noise.

33 Claims, 5 Drawing Sheets

U.S. PATENT DOCUMENTS

| | | |
|---|---|---|
| 6,353,688 B1 | 3/2002 | Puetter et al. |
| 6,490,374 B2 | 12/2002 | Puetter et al. |
| 6,882,997 B1 * | 4/2005 | Zhang et al. ................. 707/6 |
| 2005/0057687 A1 * | 3/2005 | Irani et al. .................. 348/443 |

OTHER PUBLICATIONS

Dixon, D. D.,et al., "Pixon-based deconvolution," *Astron. Astrophys. Suppl. Ser. 120*, Dec. 1996, pp. 683-686, European Southern Observatory, Provided by the NASA Astrophysics Data System, U.S.A.

Dixon, D.D. et al., "Skymapping with Osse Via the Mean Field Annealing Pixon Technique," *The Astrophysical Journal*, Aug. 1, 1997, pp. 891-899, vol. 484, The American Astronomical Society, U.S.A.

Forster, M.R. "The New Science of Simplicity". (1999). Refers to "Bayesian BIC Criterion" and specifically cites Schwarz 1978.

Marsden, D. et al., "Rosat Observations of the Soft Gamma-Ray Burst Error Box Coincident with the Supernova Remnant N49," *The Astrophysical Journal*, Oct. 10, 1996, pp. 513-520, vol. 470, The American Astronomical Society, U.S.A.

Mathworks, Inc. "GARCH Toolbox: for Use with Matlab" pp. 2-5, 2-6. Copyright 1999-2000. Provides formula for AIC and BIC. Cites as reference Box et al., from 1994.

Mathworks, Inc. "MATLAB Functional Reference: 'sum' function" Copyright 1994-2001. Also, Sepherke, Matlab "Matrix and Element-wise Operations", Mar. 21, 1998. http://www.mit.edu/afs/sipb/project/www/matlab/imatkab/node10.html.

Mathworks, Inc. "The MATLAB computing Environment for Finance and Economics" Copyright 1997. http://www.ccr.jussieu.fr/ccr/Documentation/Calcul/matlab5v11/docs/.

Metcalf, T. R. et al., "Pixon-Based Multiresolution Image Reconstruction for Yohkoh's Hard X-Ray Telescope," *The Astrophysical Journal*, Jul. 20, 1996, pp. 585-594, vol. 466, The American Astronomical Society, U.S.A.

Metcalf, T. R. et al., "Pixon-Based Multiresolution Image Reconstruction for Yohkoh's Hard X-Ray Telescope," *Maximun Entropy and Bayesian Methods*, 1996, pp. 361-365, Kluwer Academic Publishers, The Netherlands.

Murphy, Kevin, "A Brief Introduction to Graphical Models and Bayesian Networks". http:/http.cs.Berkeley.edu/~murphyk/Bayes/bayes.html. Last updated Oct. 3, 2001.

Pixon™ homepage and bibliography, Jun. 21, 2001.

Puetter, R. C., "Information, Language, and Pixon-Based Image Reconstruction," *Nonlinear Signal and Image Analysis*, Jan. 30, 1997, vol. 808, The New York Academy of Sciences, U.S.A.

Puetter, R. C., "Information, Language, and Pixon-Based Image Reconstruction," $11^{th}$ *Florida workshop on Non-Linear Astronomy and Physics*, Nov. 30-Dec. 2, 1995.

Puetter, R. C., "Information, Language, and Pixon-Based Image Reconstruction," Proceedings of SPIE, vol. 2827, Aug. 1996.

Puetter, R. C., "Language and Information Content," Proc. Of 1995 IAC Winter School, Dec. 3-12, 1995, Tenerife, Spain.

Puetter, R. C. et al., "Pixon-Based Image Reconstruction," *Maximum Entropy and Bayesian Methods*, 1996, pp. 275-292, Kluwar Academic Publishers, The Netherlands.

Puetter, R. C. et al., "Pixon-Based Multiresolution Image Reconstruction and the Quantification of Picture Information Content", Int'l. Journal of Image Systems and Technologies, pp. 314-331, Winter 1995.

Puetter, R. C., "The Image Restoration/Reconstruction Problem," in "Instrumentation for Large Telescopes," Eds. Rodriguez Espinosa, Herrero & Sanchez, Cambridge Contemporary Astrophysics, 1997, U.S.A.

Puetter, R. C., "The Pixon Methods of Image Reconstruction." Proc. ADASS '98 (Nov. 1-4, 1998), Astronomical Data Analysis Softward & Systems VIII, vol. 172, pp. 307-316.

Rick Puetter's Home Page, (Last Updated Feb. 21, 2000). http://casswww.ucsd.edu/personal/puetter.html.

SAS, Inc. "The VARMAX Procedure: Overview", Copyright 2000. Specifically states that "Schwartz Bayesian Criterion (SBC) is also known as Bayesian Information Criterion (BIC)". http://www.sas.com/rnd/app/da/new/801ce/ets/chapt4/sectl.htm.

Schlogl, Alois. "Index for /home/schloegl/matlab/tsa", "Content" and "Selmo" from "Alois' Matlab and Math's Site", Time Series Analysis pages. Aug. 17, 1997. http://www-dpmi.tu-graz.ac.at/~schloeg/matlab/tsa/1.tsa/index.html.

Schwartz, Gideon. "Estimating the Dimension of a Model", The Annals of Statistcs, vol. 6, No. 2, Mar. 1978 pp. 461-464.

USGS Northern Prairie Wildlife Research Center, "Suggestions for Presenting the Results of Data Analyses: Information-Theoretic Methods", 2001. Specifically refers to Bayesian Information Criterion (BIC) and cites Schwartz 1978.

Verndinelli, Isabella, et al., "Bayesian Goodness of Fit Testing Using Infinite Dimensional Exponential Families", Carnegie Mellon Dept. of Statistics Technical Reports, Report #640, Jan. 1996. http://www.statu.cmu.deu/tr/tr640/tr640.html.

Bilboro, Griff L. et al., "CMOS Implementation of Image Deconvolution and Mean Field Annealing", IEEE Workshop on Neural Networks for Signal Processing at Cambridge, MA (1995).

Neelamani Ramesh, et al., "Multiscal Image Segmentation Using Joint Texture and Shape Analysis", Dept. of Elect. and Computer Engineering, Rice University, Houston, TX.

Xiong, Z. et al. "Marginal Analysis Prioritization for Image Compression Based on a Hierarchical/Wavelet Decomposition", IEEE 1993.

* cited by examiner

HIGH SPEED SIGNAL ENHANCEMENT USING PIXONS

RELATED APPLICATIONS

This application is related to application Ser. No. 09/333,172, filed Jun. 14, 1999, now issued as U.S. Pat. No. 6,353,688, which is a continuation-in-part of application Ser. No. 08/073,929, filed Jun. 8, 1993, now issued as U.S. Pat. No. 5,912,993. The disclosures of both applications are incorporated herein by reference.

FIELD OF THE INVENTION

The present invention relates generally to a method for signal reconstruction and enhancement and more specifically to a method for real time enhancement of images.

BACKGROUND OF THE INVENTION

Optimal extraction of data contained within an electromagnetic signal requires the removal of defects such as noise and instrument limitations. A key area in which optimized extraction and reconstruction of data is sought is the field of image enhancement. Even when the instruments can be made essentially noise-free, instrumental signatures related to finite spatial, spectral, or temporal resolution remain. At this point, image reconstruction is required to remove the instrumental signatures Applications of image enhancement, and the sources of noise and other factors that can negatively impact data extraction efficiency cover a wide range including astronomical observation and planetary exploration, where sources can be faint and atmospheric interference introduce noise and distortion, military and security surveillance, where light can be low and rapid movement of targets result in low contrast and blur, medical imaging, which often suffers from lack of clarity, and video images, where transmission and instrument limitations, and the need for real time response, can negatively impact image sharpness and detail.

Images degraded by imperfect sensors or transmission can often be modeled as the sum of random image noise and a convolution of the true image with a point response function (PRF) or blurring kernel:

$$D(i) = \int dy H(y,i) I(y) + N(i), \quad (1)$$

where $D(i)$ is the data in cell i (typically a pixel), I is the image model, H is the point-response-function (PRF) due to instrumental and possible atmospheric blurring. The PRF is often only a function of displacement between pixels. In general, the PRF can vary across the field.

Image reconstruction differs from standard solutions of integral equations due to the noise term, N, the nature of which is only known statistically. Methods for solving such an equation fall under the categories of (1) direct methods, which apply explicit operators to data to provide estimates of the image, and (2) indirect methods which model the noiseless image, transform it forward to provide a noise-free data model, then fit the parameters of the image to minimize the residuals between the real data and the noise-free data model. The direct methods have the advantage of speed, but they tend to amplify noise, particularly at high spatial frequencies. The indirect methods supposedly exclude the noise, however, the requirement of imposing a model can be a disadvantage. If a good parametric form for the image is known a priori, the result can be very good.

Existing indirect methods of image enhancement such as chi-squared fitting and maximum entropy often result in poor quality images, introduce artifacts, and operate at speeds that are too slow for video. In spite of the inadequacies of current image enhancement techniques, the market for real time video image enhancement is growing rapidly. For example, in the U.S., military applications of video imaging for detailed reconnaissance and remote sensing information has increased over the past decade, despite a reduction in overall defense spending. The increased reliance on night-vision and heat-sensing video will only increase the demand for image enhancing devices. In the medical diagnostic field, growing restrictions imposed by insurance providers has restricted the use of sophisticated high cost imaging machinery, leading to a desire to enhance more established and less expensive imaging methods to improve their sensitivity and expand their usefulness. Furthermore, even the more sophisticated medical imaging devices, e.g., nuclear imaging methods, often suffer from noise and lack of contrast which can make diagnosis difficult, such that image enhancement is needed to optimize the imaging system's capabilities.

In imaging, the input data in many cases is obtained with a CCD detector array with a particular pixel size and shape. For example, in the imaging of star fields, the image would be best represented by a sum of point sources with arbitrarily precise positions and brightness. Since large regions of the data field will have few, if any, photon counts, portions of the pixel grid are unused, and the degrees of freedom, i.e., pixels, representing these portion of the image over-specify the data. In other portions of the image, the density of pixels may be too sparse to adequately represent the image.

The Pixon™ methods disclosed in U.S. Pat. No. 5,912,993 and co-pending application Ser. No. 09/333,172, the disclosures of which are incorporated herein by reference, approach the absolute limit of image improvement, cleanly extracting the entire image information content. In these methods, the sizes and shapes of the Pixon™ kernels are adjusted to decompose the image into the smallest number of Pixon™ elements, where each element encompasses multiple pixels. Improvement over the competing methods, some of which are described above, reaches a factor of 10 to 100 improvement in sensitivity and a factor of a few in resolution, together with robust rejection of noise and spurious artifacts. However, the previously-described Pixon™ methods achieve minimum complexity by selecting a set of Pixon™ kernels using an iterative method to optimize the size and shape of the kernels. While such an iterative process is highly effective for enhancement and reconstruction of still images, video enhancement requires real-time or nearly real-time response, making methods with a large number of iterations impractical.

Accordingly, the need remains for a method of image reconstruction which is capable of video rate response which can be readily implemented in hardware. The invention disclosed herein provides such a method.

SUMMARY OF THE INVENTION

It is an advantage of the present invention to provide a method for enhancement and reconstruction of images in substantially real time.

It is another advantage of the present invention to provide a system for real-time image enhancement for use with color video or other high speed output devices.

In an exemplary embodiment, input data comprising a video signal is processed using a combination of conventional image processing methods to deblur, or sharpen, the image and convolution with Pixon™ kernels for smoothing. The image processing and smoothing operations may be performed as four steps comprising generating an estimated image model based on the input data, where the input data comprises a plurality of image grid points, calculating a Pixon™ map to determine the degree of smoothing to be applied in each location within the image, deconvolving the input data, and smoothing the data with a spatially-variable smoothing kernel function according to the Pixon™ map to generate an output image. The order of the last two steps can be varied. For example, the (deblurred) image produced by the image processing operation can be smoothed according to the Pixon™ map. Alternatively, the smoothed image produced by using the Pixon™ map can be deblurred by the image processing operation. In the preferred embodiment, the image processing is by convolution with an approximate inverse point response function (PRF). Where the deblurring operation is performed prior to smoothing, any known image processing method, including direct or indirect methods, can be used. Minimally, the input data corresponds to at least one frame of the video signal. The step of generating an initial estimate of the image model is accomplished by coadding the input data. For a single data frame, the coadded data is the data; i.e., the input image is the image model. Generally, however, multiple data frames are input, with the multiple frames being coadded to provide the data to be processed.

Calculation of the Pixon™ map is achieved by selecting the broadest Pixon™ elements required to fit the data. Using a plurality of different size Pixon™ kernels, the image model is simultaneously convolved with each different Pixon™ kernel and the PRF. The resulting noise free data models are compared to the input data and the smoothed data obtained using the broadest Pixon™ kernel that fits the input data within a predetermined criteria are selected to form the Pixon™ map. The Pixon™ map is assembled using the indices of the broadest kernels that meet the acceptance criteria for local quality of fit. Smoothed data is then formed according to the Pixon™ map. The smoothed data is deconvolved (deblurred) and output to a video display or other appropriate device, providing a clearer image with less noise. Alternatively, the deblurred image formed by directly deconvolving the input data is smoothed according to the Pixon™ map, and the resulting image is output to the video display device.

In one embodiment, input data in the form of a video signal comprising a data frame with a plurality of pixel values within a pixel array is input into a system processor that runs software to perform operations for deblurring and smoothing. Deblurring is performed using methods known in the art, for example, Wiener filter Fourier deconvolution ("Wiener deconvolution") or other fast Fourier transform ("FFT") methods, such as convolution with an inverse PRF, or inverse PRF kernel convolution by direct summation. Indirect methods such as non-negative least squares modeling and other maximum likelihood ("ML") methods can also be used. The functional form of the deconvolution kernels is preferably selectable by a system user to optimize deblurring and minimize noise. Smoothing of the data comprises small kernel convolutions with Pixon™ elements. The choice of Pixon™ kernel used for smoothing at each location, e.g., kernel size and shape, is made by testing the change in data brought about by smoothing with a plurality of different kernels $K_1$ through $K_n$. In the preferred embodiment, the fit criterion for a given kernel is determined by performing a Taylor series expansion on the change in $\chi^2$, i.e., $\Delta\chi^2$. To increase the speed of the kernel selection process for smoothing, the input data is processed in parallel using each of the different possible kernels. A Pixon™ map is assembled using the indices of the broadest kernels that meet the criteria for acceptance, which is a function of the standard deviation of the noise. Once the smoothed data are assembled, they are deconvolved to form the reconstructed image. The reconstructed image is then output to a video display device.

In another embodiment, the input data consisting of a single input image, single data frame, of a video signal is smoothed in parallel using small kernel convolution with a plurality of Pixon™ kernels, each Pixon™ kernel having a different size. By selecting the broadest Pixon™ kernel that meets the fit criterion for each portion of the data, a Pixon™ map is generated. The smoothed data is convolved with an inverse PRF to form a reconstructed image which is output to a video display device.

In an exemplary embodiment for application to a standard NTSC (National Television Standards Committee) or PAL (Phase Alteration by Line) video stream, the video is digitized and deinterlaced to provide a high-resolution image every sixtieth of a second. If the video signal includes color, it is split into its luminance (Y) and chrominance (UV) components. Using a plurality of field programmable gate arrays (FPGAs), the luminance component of the signal is processed according to the above-described procedure, in which the luminance data are convolved, in parallel, with a plurality of different Pixon™ kernels to smooth the data. The smoothed data are compared to selected criteria for standard deviation of noise and the degree of smoothing to determine the broadest Pixon™ kernel to fit the input data, i.e., the input image. Standard deviation and smoothing are preferably operator adjustable to allow selection of the desired image quality. A Pixon™ map is created by selecting the indices of the broadest Pixon™ kernels that meet the fit criteria for each portion of the data. The resulting smoothed data are assembled according to the Pixon™ map and the data are convolved, preferably using an inverse point response function (PRF) for deblurring (sharpening). The reconstructed image is output to be merged with the unprocessed chrominance signal. The chrominance signal is delayed so that it is synchronized with the reconstructed luminance signal which has incurred a slight delay as a result of the image processing. The merged luminance and chrominance signals are input to two separate output channels: a high resolution RGB channel and an NTSC or PAL standard output channel. For the latter, the signals are re-interlaced prior to encoding for NTSC or PAL video output.

In an alternate embodiment, the de-interlacing process can be omitted and the interlaced signals are processed separately. In this embodiment, some loss of vertical resolution may occur in exchange for elimination of delay introduced by the input de-interlacer. Since no de-interlacing has occurred, the re-interlacing step for standard video output can also be eliminated.

The signal image processing method of the present invention is not limited to video image enhancement, but rather is especially advantageous for that application due to the speed at which the processing is accomplished. The inventive signal processing method is also applicable to still image enhancement and other signal processing applications.

BRIEF DESCRIPTION OF THE DRAWINGS

The present invention will be better understood from the following detailed description of some preferred embodiments of the invention, taken in conjunction with the accompanying drawings, in which like numbers correspond to like parts, and in which:

FIG. 5a shows an input image frame with superimposed noise; FIG. 5b shows the input data convolved with Pixon™ kernels of a first size (j=1); FIG. 5c shows the input data convolved with Pixon™ kernels of a second size (j=2); FIG. 5d shows the input data convolved with Pixon™ kernels of the nth size (j=n); and FIG. 5e shows a smoothed Pixon™ map assembled using the broadest Pixon™ kernels meeting the predetermined criteria.

DETAILED DESCRIPTION OF THE PREFERRED EMBODIMENTS

Figure 1:
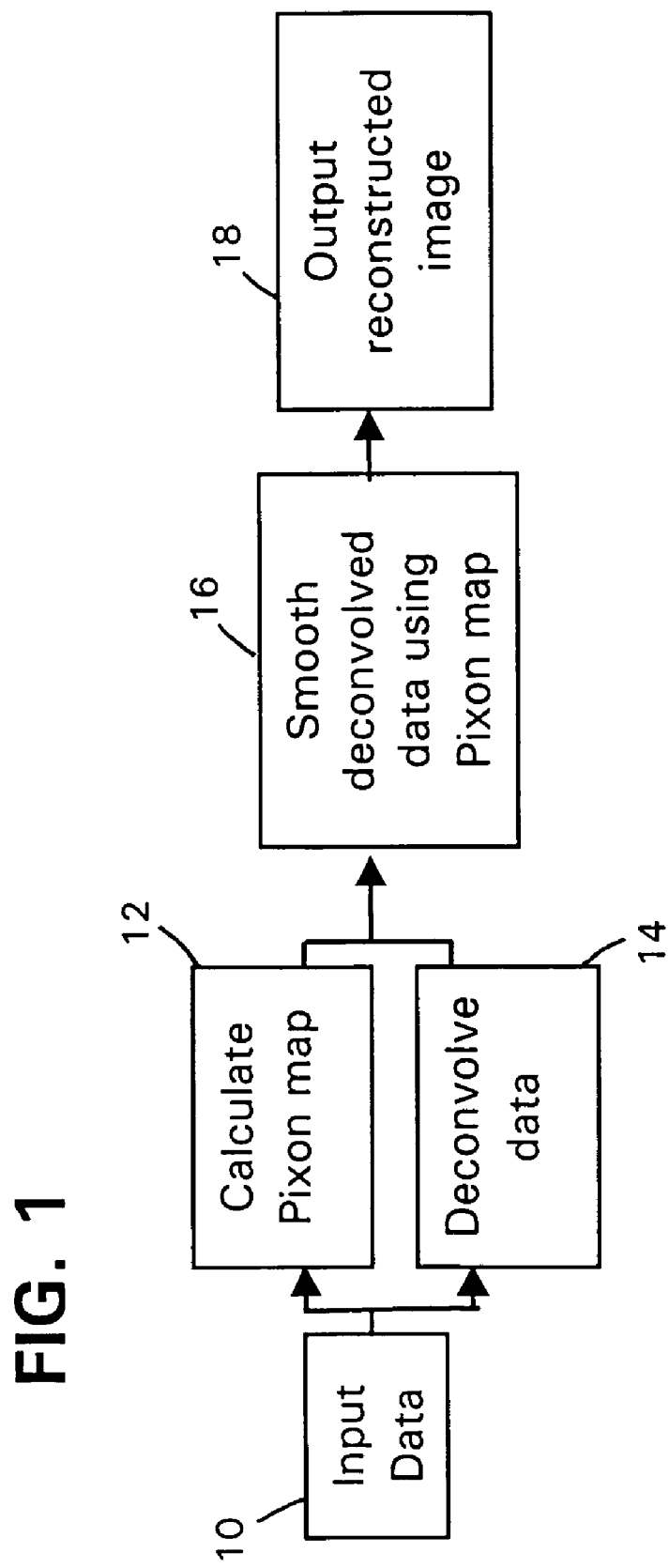
FIG. 1 is a block diagram of a general implementation of the high speed Pixon™ method.

As shown in FIG. 1, input data 10 consist of points of a digitized image, i.e., an image comprising a plurality of pixels, where each pixel represents an image data point. The input data 10 are processed by a combination of one or more conventional image processing techniques to form an image model that is smoothed by a plurality of different Pixon™ kernels and the PRF (point response function) to construct a Pixon™ map in step 12. Pixon™ elements, or kernels, are fundamental and indivisible units of information typically made up of a plurality of pixels. The actual Pixon™ elements selected during the reconstruction process represent the smallest number of such units required to fit the data and represent the minimum number of parameters necessary to specify the image. The Pixon™ kernels can have arbitrary properties, e.g., shape, size, and/or position, as needed to best fit the data. The exact shapes of the Pixon™ smoothing kernels are not critical as long as they are centrally peaked. Inverse parabolas may be used in most cases. For most applications, five to seven Pixon™ smoothing kernels are adequate, with sizes no larger than 7×7 pixels each, however, the number and sizes of kernels may be varied for an application as needed. In a preferred embodiment, the kernels are uniform in shape and logarithmic spacing between the different sizes of Pixon™ kernels is used. The choice of kernels used for smoothing at each location, i.e., sizes and shapes, is made by testing the change in the noise-free data model brought about by smoothing with each of a plurality of different Pixon™ kernels $K_1$ through $K_n$.

To calculate the Pixon™ map, the noise-free data models are compared with the input data, then the indices of the broadest kernels providing a data model with an acceptable fit to the input data are collected to form a Pixon™ map (step 12). In parallel, the input data are deconvolved (step 14) to deblur the image using a known image processing method. The image processing method may be a direct method, such as deconvolution using Wiener deconvolution, FFT methods, or inverse point response function (PRF) convolution. Alternatively, an indirect method, such as non-negative least squares fit can be used. For better computational speed, the preferred method is convolution with an approximate inverse PRF. In step 16, the deconvolved data are then smoothed according to the Pixon™ map. The reconstructed image is output to a video display (step 18) or other appropriate device, providing a clearer image with less noise when compared with the input data.

Again for better computation speed, the image model of step 12 might be set to be equal to the input data. In such a procedure, it may be desirable to perform a simple, quick filtering step via conventional image processing operation on the input data prior to mild smoothing or cleaning. In the preferred embodiment, data from multiple input data frames are coadded. The multiple data frames may be dithered. Coaddition, a practice that is well known in the field of image restoration, can reduce noise when the data frames are coregistered and added. It is also possible to interpolate the coadded data to a finer grid than that of the original data when there are multiple, dithered frames, which can lead to improved resolution. In some cases, the frames also may consist of more complexly sampled data points, in which case a data sampling function may be employed.

Figure 2:
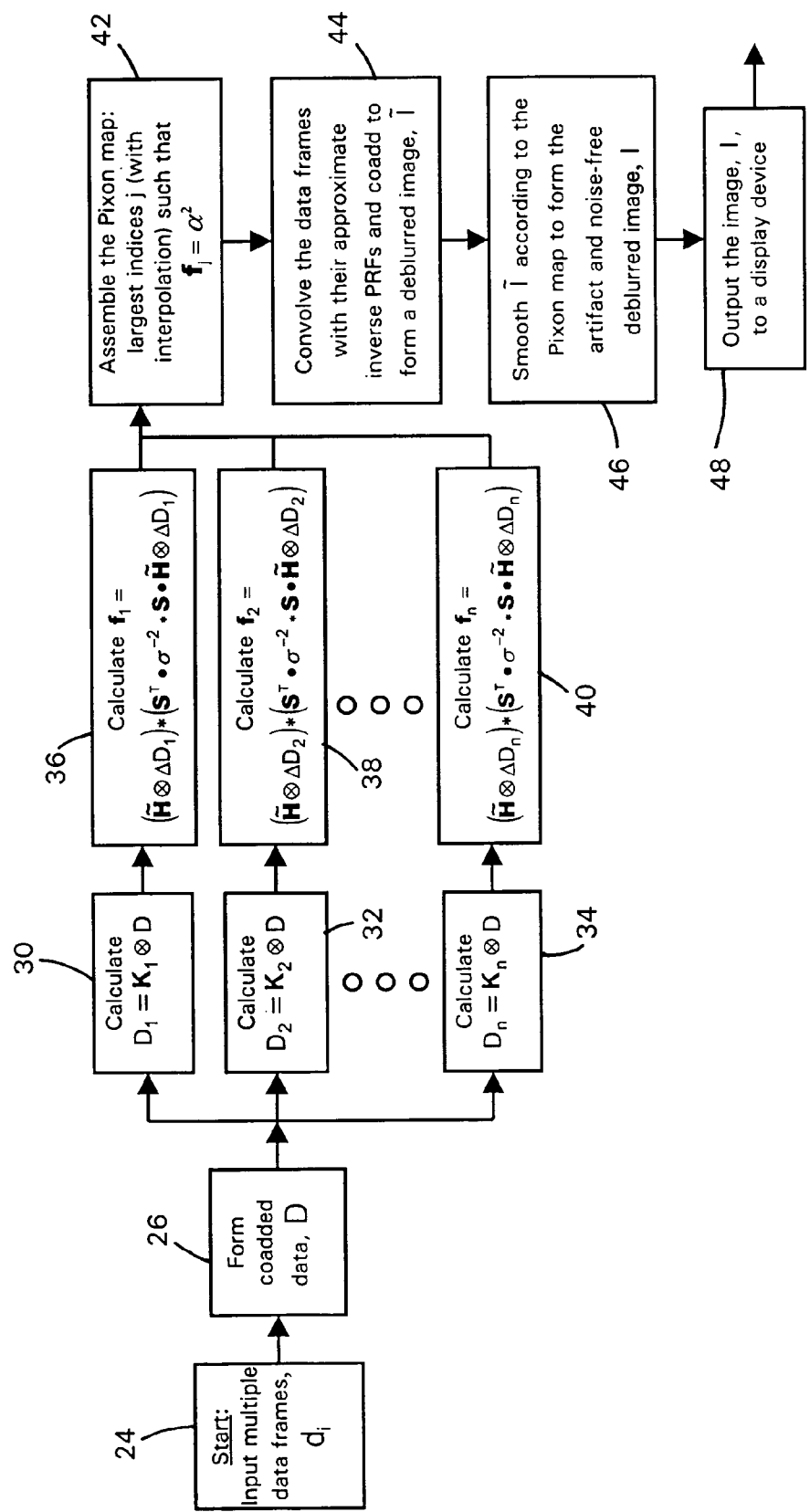
FIG. 2 is a more detailed block diagram of the high speed Pixon™ method of FIG. 1.

FIG. 2 illustrates the method steps of an embodiment of the high speed Pixon™ method in more detail. Input data ($d_i$) (step 24) comprises data points or pixels within a grid which corresponds to a digitized input image such as a frame of a video signal. While a single frame can be used, generally, i multiple data frames are preferred. The input data are coadded to produce the data (D) to be processed (step 26). Data D are convolved in parallel with a plurality of different Pixon™ kernels $K_1$ through $K_n$ in steps 30, 32, 34, i.e., $$D_j = K_j \otimes D, \quad (2)$$

where $\otimes$ is the convolution operator. (It should be noted that three different convolution operations are shown solely for ease of illustration, and that the number of different kernels and corresponding convolution operations is not intended to be limited to three.) Parallel processing of the input data with the different Pixon™ kernels can be performed in software or by the use of hardware that includes a plurality of DSPs (digital signal processors), FPGAs (field programmable gate arrays), or other hardware, which are either stand-alone or operate under microprocessor control. The choice of kernel used for smoothing at each location, e.g., kernel size and shape, is made by testing the change in data D, which in this case is the image model convolved with the PRF, brought about by smoothing with a given kernel j among the different kernels $K_1$ through $K_n$. In other words, the choice of kernel is made by estimating how much the goodness of fit changes when the data D is smoothed by a given kernel j.

In steps 36, 38 and 40, the degree of change, or goodness of fit estimate, is broken down into the contribution of each grid point in the image model using the array $f_j(j=1\ldots,n)$, by calculating:

$$f_j = (H \otimes \Delta D_j) * (S^T \bullet \sigma^{-2} \bullet S \bullet H \otimes \Delta D_j), \quad (3)$$

where $\Delta D_j = D - D_j$; S, S' are the data sampling function and its transpose, H is a mildly broadened PRF, $\sigma$ the standard deviation of the noise, • is the composition of operators, * is multiplication, and $\otimes$ is the convolution operator. Note that the broadening of the PRF is used to control noise.

At each grid point, the largest j is selected such that $f_j = \alpha^2$, where $\alpha$ is a user-specified smoothness parameter. (Pixon™ kernels are ordered such that the broadest kernel is labeled by the largest j.) Since $f_j$ is only defined for integer j, the non-integer j for which $f_j = \alpha^2$ is computed by interpolation. In one embodiment, the fit criterion for a given kernel can be determined by performing a Taylor series expansion on the change in $\chi^2$, i.e., $\Delta\chi^2$. The Pixon™ map, which is assembled in step 42, is an array consisting of the indices j chosen at each grid point.

The next step, shown as step 44, is to deconvolve the blurring effect of the PRFs. First, approximate inverse PRFs are calculated in which maximizing the resolution gain is optimally balanced with minimizing noise amplification. On one hand, resolution gain is maximized by bringing the deconvolution of the PRF itself as close as possible to the delta function. On the other hand, noise amplification by the deconvolver should be minimized. In hardware implementations of the Pixon™ method, an additional constraint is that the deconvolver kernel is restricted to being non-zero within a region with a small elliptical boundary.

The preferred procedure for obtaining the optimized small kernel deconvolver (OSKD) is by minimizing the optimization function:

$$L = \sum_i \left( \delta_{io} - \sum_j H_{i-j} f_j \right)^2 + \lambda \sum_j f_j^2 + 2\mu \sum_j f_j,$$

where $\delta_{io}$ is the "residual" PRF with which the true image is convolved to form the image estimate. Ideally, $\delta_{io}$ is a delta function centered at the origin, in which case the deconvolution completely recovers all of the lost resolution (although noise may be greatly amplified in the process) but which also may be chosen to be some other narrow function such as a Gaussian), $H_{i-j}$ is the PRF, $f_j$ is the OSKD, which is restricted to being non-zero within an elliptical region of predetermined size, and the summations are over all pixels.

The first term on the right hand side of Equation 4 minimizes the difference between the deconvolved PRF and the residual PRF. The second term on the right hand side of the equation minimizes the noise amplification, whose square is given by the sum over $f_j^2$. The coefficient $\lambda$ is a user-adjustable parameter that sets the tradeoff between resolution gain and noise amplification. Finally, the normalization of the OSKD to unit total is maintained by adding the third term on the right hand side, where $\mu$ is a Lagrange multiplier. (The factor of 2 is introduced for convenience.)

Taking the gradient of Equation 4 with respect to the $f_j$ and setting it to zero, then rearranging terms, produces the linear equation $$\sum_k A_{jk} f_k = H_j - \mu, \quad (5)$$

where the elements of the matrix A are given by $$A_{jk} = \delta_{jk} + \sum_i H_{i-j} H_{i-k}. \quad (6)$$

In vector notation, the solution to Equation 5 is:

$$f = A^{-1} H - \mu A^{-1} 1, \quad (7)$$

where 1 is a vector whose components are all unity. In practice, it is not necessary to invert the matrix A. One simply solves separate linear equations of the form Ax=b for the two terms on the right hand side of Equation 7. The Lagrange multiplier, $\mu$, is determined by requiring f to add up to unit total.

Continuing in step 44, the deconvolved image is obtained by coadding the deconvolved data frames. The process of coadding is the same as in step 26 except that the frames are convolved with the approximate inverse PRFs before being coadded.

In step 46, the deconvolved image is smoothed by a spatially variable kernel function, with the smoothing kernel $K_j$ at each location chosen according to the Pixon™ map constructed in step 42. Finally, the reconstructed image is output to an appropriate display device such as a television or high resolution monitor.

Figure 3:
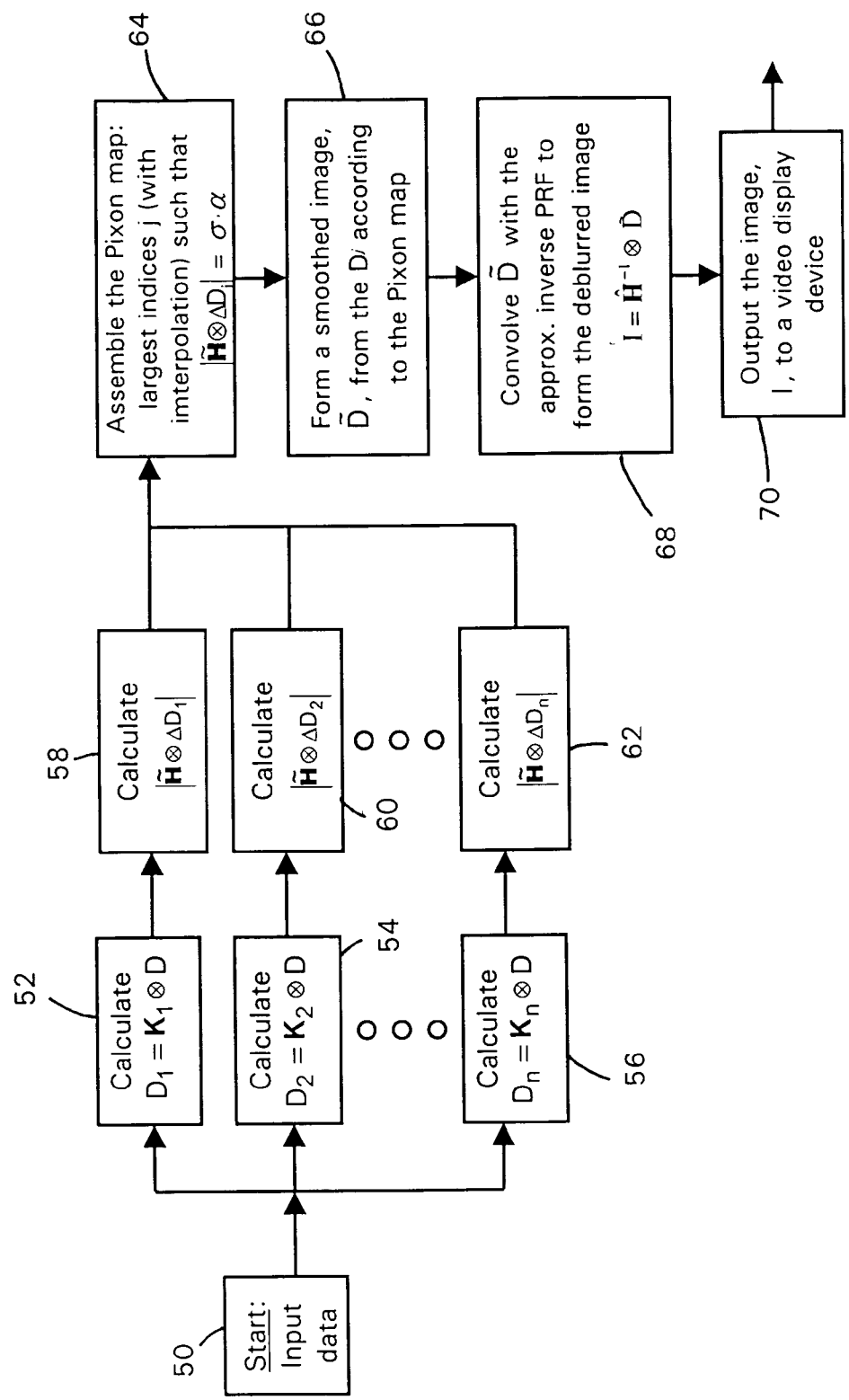
FIG. 3 is a block diagram showing a hardware implementation of the high speed Pixon™ method.

Referring the FIG. 3, which illustrates a hardware implementation of the Pixon™ method, the input (box 50) is made up of only a single frame, and there is no data sampling function, such that there is equal gridding of the data and image model. After convolution with j Pixon™ kernels in steps 52, 54 and 56, the amount of change (goodness-of fit) is determined in steps 58, 60 and 62. Taking advantage of the single data frame with the same gridding as the image, $f_j$ as calculated above is replaced with a broadened point response function (PRF) H, i.e.,:

$$f_1 = |H(\tilde{x}) \Delta D_1|. \quad (8)$$

This leads to significant savings in the number of convolutions computed. In step 64, the Pixon™ map is assembled using the largest indices j with interpolation such that:

$$|H(\tilde{x}) \Delta D_j| = \sigma \cdot \alpha. \quad (9)$$

In an exemplary hardware implementation of the Pixon™ method, the value of $\sigma \cdot \alpha \{(\text{standard deviation of noise}) \cdot (\text{degree of smoothing})\}$ is preferably operator adjustable to allow selection of the desired image quality. The value of $\sigma \cdot \alpha$ affects the level at which the reconstruction attempts to recover features in the image. If the noise level is set high, only strong signals will remain. If it is set too low, many artifacts generated by noise will pass through the Pixon™ process. The value of $\sigma \cdot \alpha$ is thus user-selectable to accommodate different conditions in the field. Prudent application of this control can quickly tell the user the believability of the features at the edge of detectability. Smoothing is determined by Pixon™ scaling, i.e., an adjustable monotonic function of kernel size. Control of smoothing is operator-adjustable to allow the user to customize the hardware preferentially to present point sources or to suppress them, or to emphasize objects of a particular scale.

Another advantage of the single data frame input is that the order of smoothing and convolution can be reversed. Specifically, in step 66, a smoothed image D is formed according to the Pixon™ map, then the smoothed image is convolved with an approximate inverse PRF in step 68 to form the deblurred image $$I = \hat{H}^{-1}(\tilde{x}) D. \quad (10)$$

In the hardware implementation, the deblurring function is read from a table under microprocessor control, and entry into the table is controlled by a user-accessible knob. A useful application of this feature is to allow the user to remove blurring functions of varying widths, which is particularly applicable to field work, where blurring conditions can change. Further, since the kernel is loaded from a table, a wide range of custom applications with different PRFs, or other types of enhancements can be accomodated.

Finally, as before, the reconstructed image is output to a video display device in step 70.

The embodiment illustrated in FIG. 3 depicts a hardware implementation of the method which is adapted to minimize the amount of hardware required, i.e, only a small number of FPGAs are required.

Figure 4:
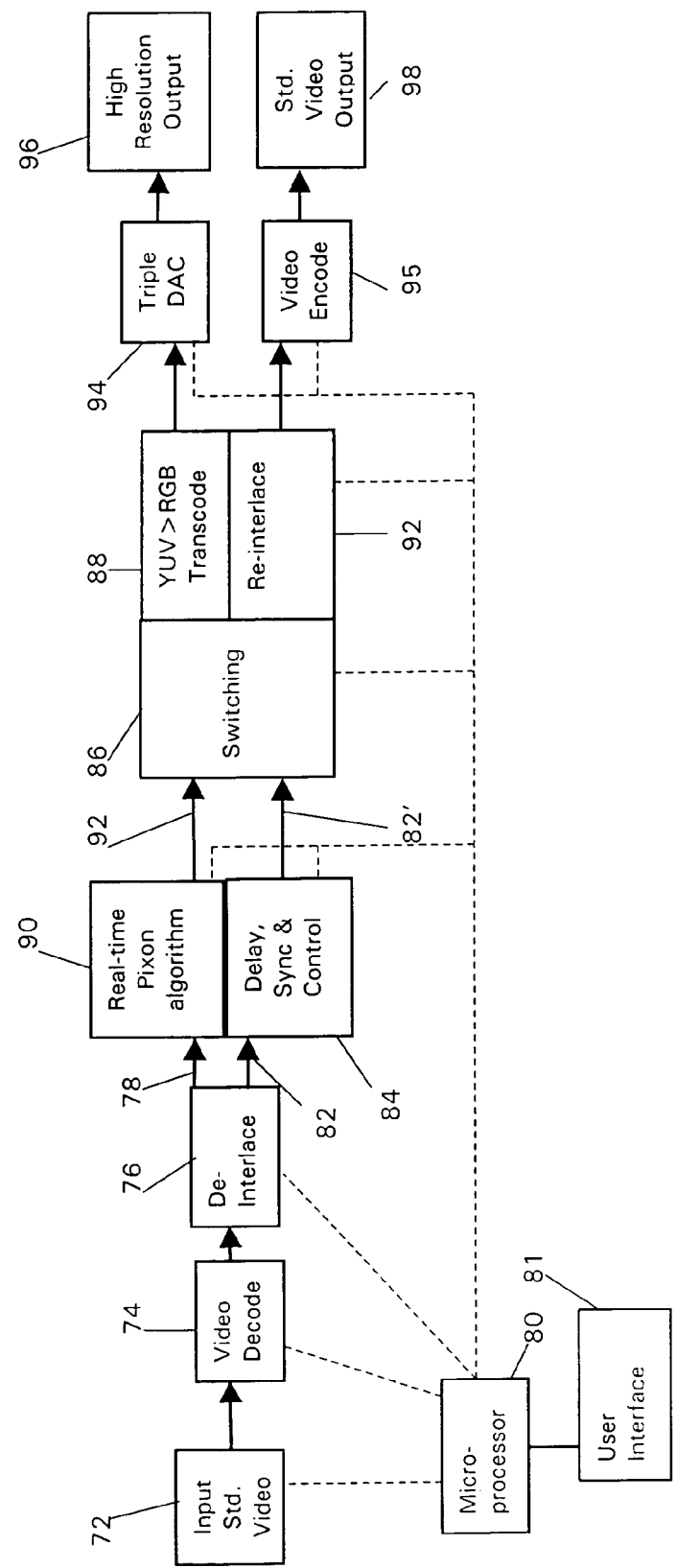
FIG. 4 is a block diagram of the steps for processing a video stream according to the present invention.

Referring to FIG. 4, a standard NTSC (National Television Standards Committee) video stream provides the input signal 72. Under the control of microprocessor 80, which controls all modules in the image processing system (as indicated by the dashed lines), the video is decoded 74 and deinterlaced 76 to provide a high-resolution image every sixtieth of a second. If the video signal includes color, it is split into its luminance (Y) 78 and chrominance (UV) 82 components. Using a plurality of field programmable gate arrays (FPGAs) under microprocessor control, the luminance component of the signal is processed according to the above-described procedure, in which the luminance data is convolved, in parallel, with a plurality of different Pixon™ kernels (step 90). The change between the Pixon™ kernel convolved data and the input data is compared to selected criteria for standard deviation of noise and smoothing to determine the broadest Pixon™ kernel to fit the data. The standard deviation and smoothing are user-selectable via user interface 81, which can be knobs, buttons, a mouse, a keypad, a keyboard, or other means for inputting selections.

A Pixon™ map is constructed using the broadest Pixon™ kernel that fits the input data, and the appropriate smoothed data corresponding to the selected kernels are inserted into the Pixon™ map. User-adjustable features include standard deviation of the noise and Pixon™ scaling (to vary smoothness.) The resulting smoothed data is deconvolved, preferably using an inverse point response function (PRF) to provide a luminance signal 92 carrying a reconstructed image. The chrominance signal 82 is passed forward through the hardware without processing, but appropriately delayed at 84 to provide signal 82' which is synchronized with the processed luminance signal 92. Selection of the actual deconvolution function is user-selectable to allow for compensation for changed blurring conditions. The luminance 92 and chrominance 82' signals are merged and switched at 86 for input to two separate output channels. In the first channel 88, the luminance and chrominance signals are converted into an RGB signal and digitized by a triple digital-to-analog converter (DAC) 94 and output to a high resolution monitor 96, such as an SVGA monitor. The second channel is a NTSC or PAL standard output channel 98. For the latter, the signals are re-interlaced 92 prior to encoding for NTSC or PAL video output 95.

In an alternate embodiment, the de-interlacing process (step 76) is omitted and the interlaced signals are processed separately. In this embodiment, some loss of vertical resolution may occur in exchange for elimination of delay introduced by the input de-interlacer. In this case, the re-interlacing step (step 92) for standard video output can also be eliminated.

Figure 5A:
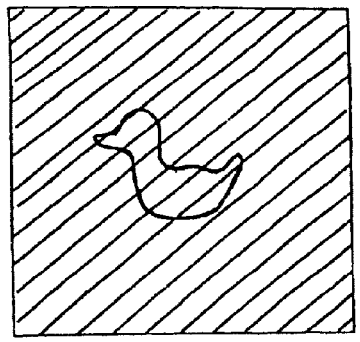
FIGS. 5a through 5e illustrate a simulated smoothing operation using Pixon™ kernels, where
Figure 5B:
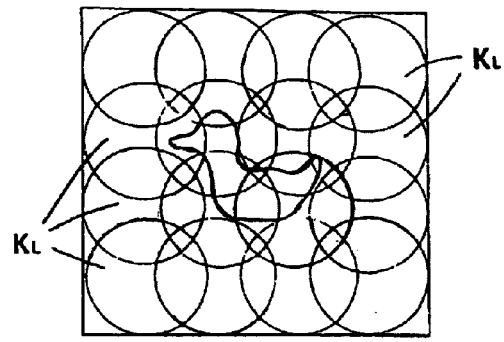
Figure 5C:
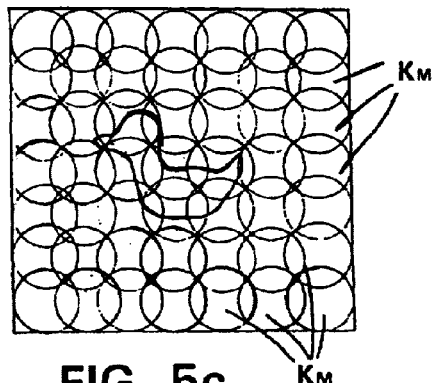
Figure 5D:
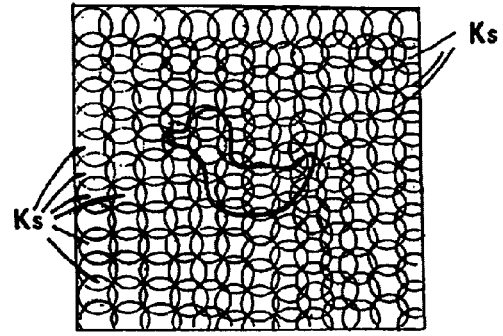
Figure 5E:
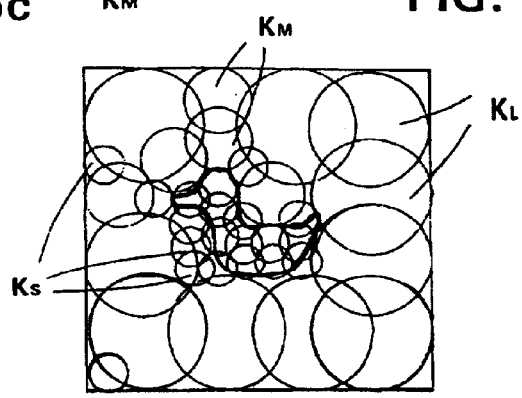

FIGS. 5a through 5e illustrate a simulated smoothing operation using Pixon™ kernels. FIG. 5a shows an input image frame with superimposed noise represented by diagonal lines. In this example, only a single image frame is used, so the grid for the input image frame is the same as the image model. FIG. 5b shows the input data convolved with Pixon™ kernels $K_L$, which correspond to the broadest available Pixon™ kernel of size j=L (large). It should be noted that identification of kernel $K_L$ as the broadest kernel is merely an example. Unlike other Pixon™ methods, the kernels are not necessarily ordered from broadest to smallest or vice versa, because all of the Pixon™ kernel convolution steps are performed in parallel. FIG. 5c shows the input data convolved with Pixon™ kernels $K_M$ of a second size, j=M (medium), and FIG. 5d shows the input data convolved with Pixon™ kernels of size j=S (small). FIG. 5e shows an exemplary combination of the broadest Pixon™ kernels that visually appear to generally fit the original image, thus producing a Pixon™ map. The input data corresponding to each data point in the grid is convolved with the kernel that provides the best fit at that point in the grid. For example, data points falling within the upper right corner of the image frame would be smoothed using kernel $K_L$, while data points falling in the center of the image frame would be smoothed using kernel $K_S$.

The high speed Pixon™ method is applicable to image reconstruction of time series data from, for example, detectors used in infrared, ultraviolet, gamma-ray or X-ray astronomy, and to image reconstruction for medical imaging techniques, such as magnetic resonance imaging (MRI), gamma-ray and x-ray imaging, positron emission tomography (PET) and other nuclear imaging technologies, radar imaging, photographic enhancement for night vision cameras, security cameras, and aerial and satellite reconnaissance, and virtually any other still or video imaging technology.

It will be evident that there are additional embodiments and applications which are not specifically included in the detailed description, but which fall within the scope and spirit of the invention. The specification is not intended to be limiting, and the scope of the invention is to be limited only by the appended claims.

We claim:

1. A method for high speed enhancement of a video image comprising:

inputting a signal containing input data corresponding to a frame of the video image, the input data comprising a plurality of data points on a grid;

convolving the input data with each kernel of a plurality of different sized kernels to generate a plurality of convolved data sets;

determining a change in data between the input data and each convolved data set of the plurality;

comparing the change to a fit criterion;

selecting the broadest kernel of the plurality of different sized kernels that satisfies the fit criterion for each portion of the plurality of data points;

identifying indices within the grid for the selected kernels corresponding to each portion of data points and assembling a kernel map using the indices;

assembling the convolved data according to the kernel map to produce smoothed data;

deblurring the smoothed data for form a reconstructed image; and outputting the reconstructed image to a video display device.

2. The method of claim 1, wherein the input signal comprises a luminance component of a standard NTSC video stream and the reconstructed image is an enhanced luminance signal.

3. The method of claim 2, wherein, prior to outputting the image to a video display device, the enhanced luminance signal is merged with a chrominance component of the standard NTSC video stream.

4. The method of claim 3, wherein the chrominance component is synchronized with the enhanced luminance signal.

5. The method of claim 2, wherein the NTSC video stream is de-interlaced.

6. The method of claim 5, wherein the image is interlaced prior to output to a video display device.

7. The method of claim 1, wherein the step of deblurring comprises convolving the smoothed image with an approximate inverse point response function.

8. The method of claim 7, wherein the approximate inverse point response function is obtained by minimizing an optimization function of the form:

$$L = \sum_i \left(\delta_{i0} - \sum_j H_{i-j} f_j\right)^2 + \lambda \sum_j f_j^2 + 2\mu \sum_j f_j,$$

where $\delta_{i0}$ is a residual point response function, $H_{i-j}$ is a point response function, $f_j$ is the approximate inverse point response function, $\lambda$ is an adjustable parameter that sets a tradeoff between resolution gain and noise amplification, and $\mu$ is a Lagrange multiplier.

9. The method of claim 1, wherein the change is determined according to the relationship $f_j = |H \otimes D_j|$, where H is a broadened point response function (PRF), $D_j$ is the convolved data that was convolved by kernel j, and $\otimes$ is the convolution operator.

10. The method of claim 9, wherein the fit criterion is $f_j \leq \alpha \cdot \sigma$, where $\alpha$ is a variable kernel map smoothness control and $\sigma$ is the standard deviation of noise in the input image.

11. The method of claim 1, wherein the step of convolving the input data is performed in parallel by all kernels of the plurality of kernels.

12. A method for image reconstruction comprising:
(a) receiving input data corresponding to at least one input image, the input data comprising a plurality of data points on a grid;
(b) smoothing the at least one input image according to a kernel map comprising selected kernels from a plurality of different kernels, wherein the selected kernels are selected by:
(i) convolving the input data with each kernel of the plurality of kernels, wherein each kernel has a different size for encompassing different portions of the plurality of data points and generating convolved data corresponding to each kernel;
(ii) for each kernel, determining a change from the input data to the convolved data;
(iii) comparing the change to a fit criterion;
(iv) selecting the broadest kernel of the plurality of kernels that satisfies the fit criterion for a portion of the plurality of data points;
(v) identifying indices within the grid for the selected kernels corresponding to the portion of data points and assembling the kernel map using the indices;
(c) before or after the step of smoothing, deblurring the image to form a deblurred image, wherein, if deblurring occurs after the step of smoothing, the smoothed image is deblurred; and if deblurring occurs before the step of smoothing, the deblurred image is smoothed; and
(d) outputting a reconstructed image comprising the deblurred and smoothed image to a display device.

13. The method of claim 12, wherein the plurality of kernels comprises 5 to 7 different kernel sizes.

14. The method of claim 12, wherein the step of deblurring comprises convolving the smoothed image with an approximate inverse point response function (PRF).

15. The method of claim 14, wherein the approximate inverse point response function (PRF) is a minimized optimization function which is minimized by minimizing the difference between a deconvolved PRF and a residual PRF, minimizing noise amplification, and normalizing the optimized small kernel deconvolver.

16. The method of claim 12, wherein the step of deblurring comprises convolving the input image with an approximate inverse point response function (PRF).

17. The method of claim 12, wherein the at least one input image comprising at least one video frame.

18. The method of claim 17, wherein the at least one input image comprises a plurality of image frames, and further comprising coadding the data from each image frame to produce the input data.

19. The method of claim 17, wherein the input data comprises a luminance component of a video image frame of a standard NTSC video stream and further comprising, before the step of receiving, dividing the video image frame into the luminance component and a chrominance component.

20. The method of claim 19, wherein the reconstructed image is an enhanced luminance signal.

21. The method of claim 17, wherein the display device is a video display device and further comprising, prior to outputting the image to the video display device, merging the enhanced luminance signal with the chrominance component.

22. The method of claim 21, further comprising synchronizing the chrominance component with the enhanced luminance signal prior to the step of merging.

23. The method of claim 12, wherein steps (b)(i) and (b)(ii) are performed in parallel by all kernels of the plurality of different kernels.

24. A system for high speed enhancement of a video image comprising:
an input for inputting a signal containing input data corresponding to a frame of the video image, the input data comprising a plurality of data points on a grid;
a processor for convolving the input data with each kernel of a plurality of different sized kernels, assembling a kernel map by selecting the broadest kernel of the plurality of different sized kernels that satisfies a fit criterion for each portion of the plurality of data points, and smoothing the input data in accordance with the kernel map to generate smoothed data;
an image processing function within the processor for deblurring the smoothed data for form a reconstructed image; and
a video display device for receiving and displaying the reconstructed image.

25. The system of claim 24, wherein the input signal comprises a luminance component of a standard NTSC video stream and the reconstructed image is an enhanced luminance signal.

26. The system of claim 25, further comprising a switch for combining the enhanced luminance signal with a chrominance component of the standard NTSC video stream.

27. The system of claim 26, further comprising a delay element for synchronizing the chrominance component with the enhanced luminance signal.

28. The system of claim 26, further comprising a de-interlacer for de-interlacing the NTSC video stream prior to processing the luminance component.

29. The system of claim 28, further comprising an interlacer for interlacing the combined enhanced luminance signal and the chrominance component prior to output to the video display device.

30. The system of claim 24, wherein the image processing function comprises an approximate inverse point response function.

31. The system of claim 30, wherein the approximate inverse point response function is obtained by minimizing an optimization function of the form:

$$L = \sum_i \left(\delta_{i0} - \sum_j H_{i-j} f_j\right)^2 + \lambda \sum_j f_j^2 + 2\mu \sum_j f_j,$$

where $\delta_{i0}$ is a residual point response function, $H_{i-j}$ is a point response function, $f_j$ is the approximate inverse point response function, $\lambda$ is an adjustable parameter that sets a tradeoff between resolution gain and noise amplification, and $\mu$ is a Lagrange multiplier.

32. The system of claim 24, further comprising a user interface for inputting selections for standard deviation and smoothness of the kernels.

33. The system of claim 24, wherein the processor convolves the input data in parallel, simultaneously using all kernels of the plurality of different kernels.

* * * * *